UNITED STATES PATENT OFFICE.

RUDOLF KECK, OF DENVER, COLORADO.

CYANID PROCESS OF EXTRACTING PRECIOUS METALS FROM THEIR ORES.

SPECIFICATION forming part of Letters Patent No. 566,986, dated September 1, 1896.

Application filed July 3, 1895. Serial No. 554,878. (No specimens.)

*To all whom it may concern:*

Be it known that I, RUDOLF KECK, a citizen of the United States, residing in Denver, in the State of Colorado, have invented certain new and useful Improvements in the Cyanid Process for the Extraction of Precious Metals from Their Ores, of which the following is a specification.

My invention relates to what is commonly known as the "cyanid process for the extraction of precious metals," which consists, generally speaking, first, in the preparation of a solution of cyanid of potassium or sodium or similar salt; second, in the lixiviation of the powdered ore or tailings with said solution, whereby there is formed a soluble compound salt of potassium or other base with the precious metal, which is taken up in the solution; third, in the separation of the solution from the solid matter, and, fourth, in the extraction of the gold and other precious metal therefrom. This fourth step is accomplished by various processes, among them being the application of electrolysis. My invention relates solely to this fourth step of the cyanid process when electrolytically effected; that is to say, when the solution containing the precious metal is converted into an electrolyte and the precious metal deposited upon the negative pole. More specifically my invention relates to the character of the electrodes to be used in this fourth step.

In the electrolytic separation of the precious metal from the cyanid solution there are two ends which it is exceedingly desirable to attain. The first is to reduce the length of time necessary to precipitate all of the precious metal upon the electrode, and the second is to leave the solution after the precious metal has been separated therefrom in as nearly as possible its original condition before the precious metal was dissolved therein, in order that the solution may be used over again, thereby saving the expense of the preparation of a new cyanid solution. Both of these ends I find to be greatly furthered by my invention, which consists in employing for the purpose of effecting the electrolytic separation a cathode of aluminium, or its alloys, with copper or zinc, although I prefer to make use of an electrode of pure aluminium. In connection with the aluminium cathode I find it desirable to employ a lead anode. These electrodes may be arranged in various ways; but I find it best to arrange them in the form of alternating plates of lead and aluminium.

A further advantage is that the precious metals precipitated upon the aluminium electrode can be easily brushed off and at once run down into bullion by smelting.

Having thus described my invention, I claim—

1. The process of extracting precious metals from their ores, which consists in dissolving said metals in a cyanid solution and extracting them therefrom by electrolytic precipitation upon an aluminium cathode, substantially as set forth.

2. The process of extracting precious metals from their ores, which consists in dissolving said metals in a cyanid solution and extracting them therefrom by electrolytic precipitation effected by alternating plates of lead and aluminium, the former being anodes and the latter cathodes, substantially as set forth.

RUDOLF KECK.

Witnesses:
   HENRY L. B. WILLS,
   ELLIS L. SPACKMAN.